US006988813B2

(12) United States Patent
Hoelen et al.

(10) Patent No.: US 6,988,813 B2
(45) Date of Patent: Jan. 24, 2006

(54) LIGHT PANEL WITH ENLARGED VIEWING WINDOW

(75) Inventors: Christoph Gerard August Hoelen, Eindhoven (NL); Gerard Harbers, S'Hertogenbosch (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 8 days.

(21) Appl. No.: 10/227,228

(22) Filed: Aug. 23, 2002

(65) Prior Publication Data

US 2003/0043567 A1 Mar. 6, 2003

(30) Foreign Application Priority Data

Aug. 27, 2001 (EP) .................................. 01203237

(51) Int. Cl.
*F21V 8/00* (2006.01)
(52) U.S. Cl. ........................................ 362/31; 362/555
(58) Field of Classification Search ................ 362/31, 362/555, 235

See application file for complete search history.

(56) References Cited

U.S. PATENT DOCUMENTS

| 5,365,411 | A | * | 11/1994 | Rycroft et al. | ................ 362/20 |
| 6,447,133 | B1 | * | 9/2002 | Eschke et al. | ................ 362/31 |
| 6,530,670 | B2 | * | 3/2003 | Hirayama | ................ 362/31 |

* cited by examiner

*Primary Examiner*—Laura K. Tso

(57) ABSTRACT

The invention relates to a light panel (12), comprising: a light guide having a front surface defining a viewing window (11), a back surface and sides (3, 4) between the front and back surfaces; and a patterned array of light sources (8, 9, 10) of at least two types, which types are distinguished by the color of light emitted by the light sources of said at least two types, said array being arranged along at least one of the sides. Each light source generates in use a divergent light beam of a color into the panel to, in combination, color the panel. Further, the array comprises complementary sub-arrays (8, 9, 8, 9 & 9, 10, 9, 10) of light sources along at least two of the sides. Since the sub-arrays are complementary, in that by all light sources of the different types the same amount of light is emitted into the light guide as in prior art single array configurations (the same number of light sources), but from two or more sides while maintaining the general light source pitch, the average distance or pitch between light sources of one of the types, can be decreased. Therewith also the required distance or colors for color mixing is lessened and the viewing window is enlarged.

11 Claims, 3 Drawing Sheets

LIGHT PANEL WITH ENLARGED VIEWING WINDOW

BACKGROUND OF THE INVENTION

The present invention relates to a light panel, comprising: a light guide having a front surface defining a viewing window, a back surface and sides between the front and back surfaces; and a patterned array of light sources of at least two types, which types are distinguished by the color of light emitted by the light sources of said at least two types, said array being arranged along at least one of the sides, wherein each light source generates in use a divergent light beam of a color into the panel to, in combination, color the panel.

Such a light panel is known, for instance from LCD backlighting.

Light panels having light sources of at least two types, i.e. two colors, have several advantages over light panels with single color light sources, for instance phosphor converted white LED's. The so-called white point is adjustable and not for instance determined by the phosphor mix. The available color spaces which is determined by the combination of the lamp spectrum and the color filter spectra, is increased. Practically any color point can be produced, including white, by controlling and adjusting the light output of the different color LED's and the color space can be increased as a result of the higher degree of color saturation, that can be obtained with light sources of different types/colors.

However, in the light panels with light sources of at least two types/colors, generating divergent light beams into the panel, a considerable length is required for the colors from the distinct types of light sources to mix and provide the desired color, for instance white. This distance is a limitation on the viewing window, because in the known light panels, wherein the light sources are arranged along a single side thereof, the pitch between light sources of the same color is a number of times larger than the light source-to-light source pitch. The light sources in the known array along the single side of the light panel can for instance be provided in a pattern RGB or, when a larger green flux is desirable or when different colors green with respect to wave length or efficacy is/are desirable, RGBG. It will be immediately apparent to one, skilled in the art, that when the light sources are directed into the panel and generate divergent light beams, the length over which the light beams should be enabled to mix, and which therefore can not be used for the viewing window, is considerable.

SUMMARY OF THE INVENTION

The present invention has for an object to obviate or at least decrease the above stated problems and disadvantages of the prior art light panels, to which end according to the invention light panels are provided, which are distinguished in that the array comprises complementary sub-arrays of light sources along at least two of the sides. Since the sub-arrays are complementary, in that by all light sources of the different types the same amount of light is emitted into the light guide as in prior art single array configurations (the same number of light sources), but from two or more sides while maintaining the general light source pitch, the average distance or pitch between light sources of one of the types, can be decreased. Therewith also the required distance or colors for color mixing is lessened and the viewing window is enlarged. With a proper choice of patterns in the sub-arrays of light sources, this average distance can even be reduced to the pitch between light sources. The latter case can for instance be achieved, when the prior art array along a single side in a pattern RGBG is, according to the present invention, replaced by two sub-arrays along two sides; RBRB along the one or two of the sides and GGGG along the one or two of the other of the sides. Along the side or sides with the pattern GGGG the pitch between light sources of one color is reduced in effect to the pitch between light sources in general. Thereby, along that particular side, the viewing window limiting distance corresponding with an adequate distance for the different colors to mix is reduced to the absolute minimum and only determined by said pitch. According to the present invention the viewing window limiting distance is decreased, whereby, to obtain a viewing window of a specific size, the total configuration can be decreased in size.

In preferred embodiments sub-arrays can be provided along two, three, four, etc. of the sides of the light panel, dependent on the shape thereof, the desired or required green flux, etc. Preferably the light sources are light emitting diodes (LED's).

In order to avoid undesirable reflections of light beams directed into the panel, means for passing the light beams out of the light panel are sensitive to direction, in order to pass only light from specific sub-arrays. Such means can be a pattern of grooves or a grating. In specific embodiments the sub-arrays will usually be arranged along sides where adjacent sides enclose an angle of substantially no more or less than 90 degrees. This is of course a light panel having a rectangular shape, but no other shapes are excluded from the use of the present invention. The only anticipated, but non-restrictive requirement is that the light beams emitted by the sub-arrays are oriented approximately orthogonally once they are propagating inside the light conducting panel.

BRIEF DESCRIPTION OF THE DRAWING

The invention will be further elucidated hereinbelow, where a description is provided of certain prior art light panels and light panels according to the present invention according to the accompanying drawings, in which.

DESCRIPTION OF THE PREFERRED EMBODIMENTS

Figure 1:
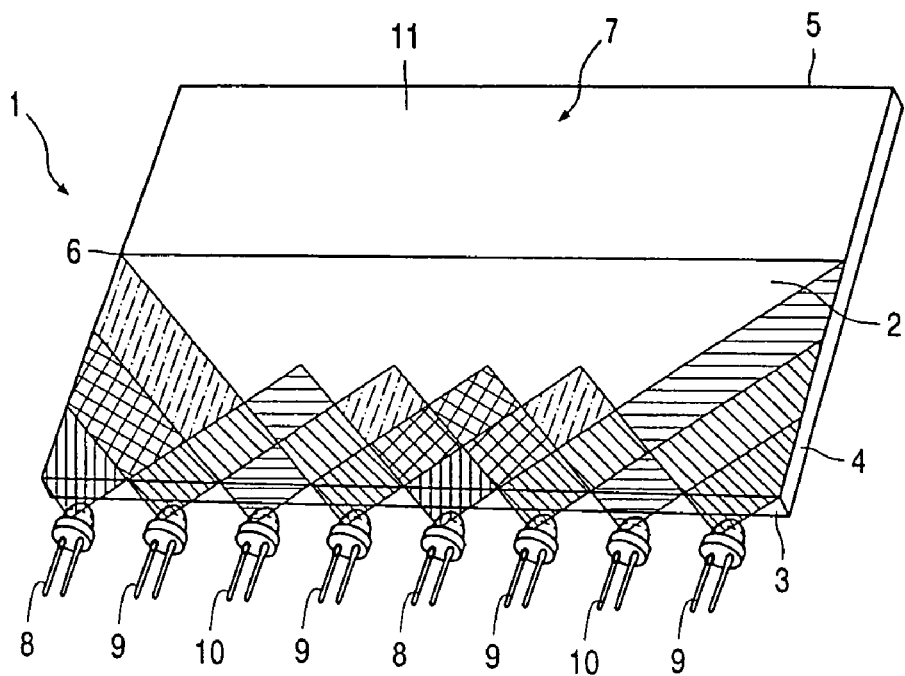
FIGS. 1 and 2 respectively show prior art light panels.
Figure 2:
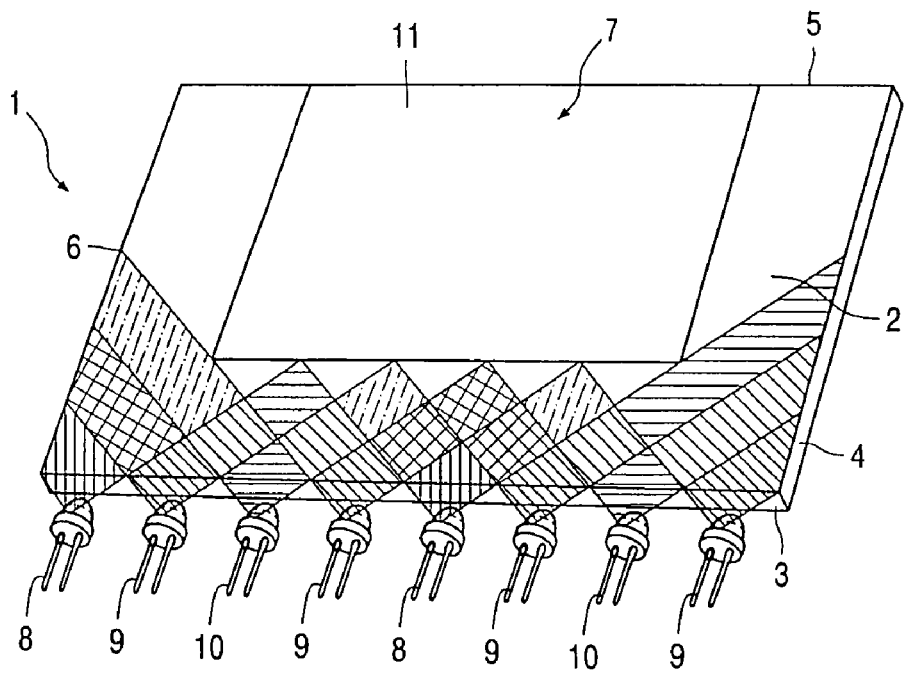

FIGS. 1 and 2 show essentially the same prior art light panel 1. The light panel 1 comprises a light guide 2 having sides 3, 4, 5 and 6. Further the light guide has a front surface 7 and a back surface (not shown).

Along side 3 a patterned array of light sources of three types, i.e. colors, is arranged. There are red LED's 8, green LED's 9 and blue LED's 10. Therefore the pattern is RGBG. This is the same both in FIG. 1 and FIG. 2. The difference between FIGS. 1 and 2 is the location, shape and size of the viewing window 11, which in FIG. 1 is defined by the shortest distance at sides 4 and 6, where the viewing window 11 can be arranged, i.e. where the light beams from the LED's 8, 9 and 10 have mixed sufficiently, whereas in FIG. 2 the viewing window 11 is defined by the viewing window limiting distance at the middle of side 3 in the direction of side 5.

It is apparent from FIGS. 1 and 2, that the viewing window 11 of the prior art light panel are severely restricted by the distance from the side, along which the light sources are arranged, which distance is required for sufficient mixing of the light beams generated by the light sources.

Figure 3:
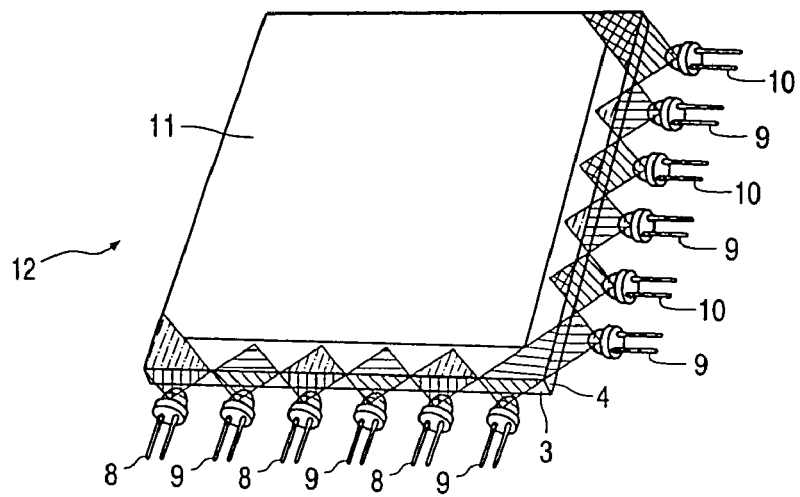
FIGS. 3, 4 and 5 schematically show light panels according to the present invention.
Figure 4:
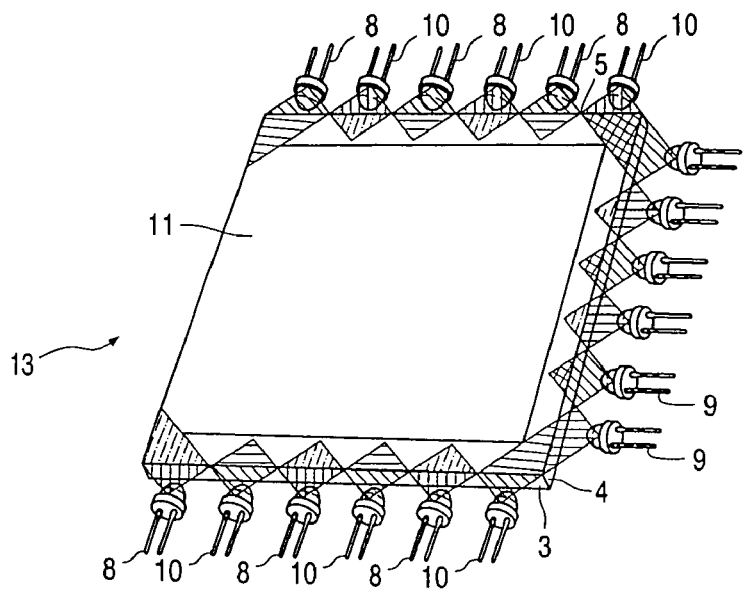
Figure 5:
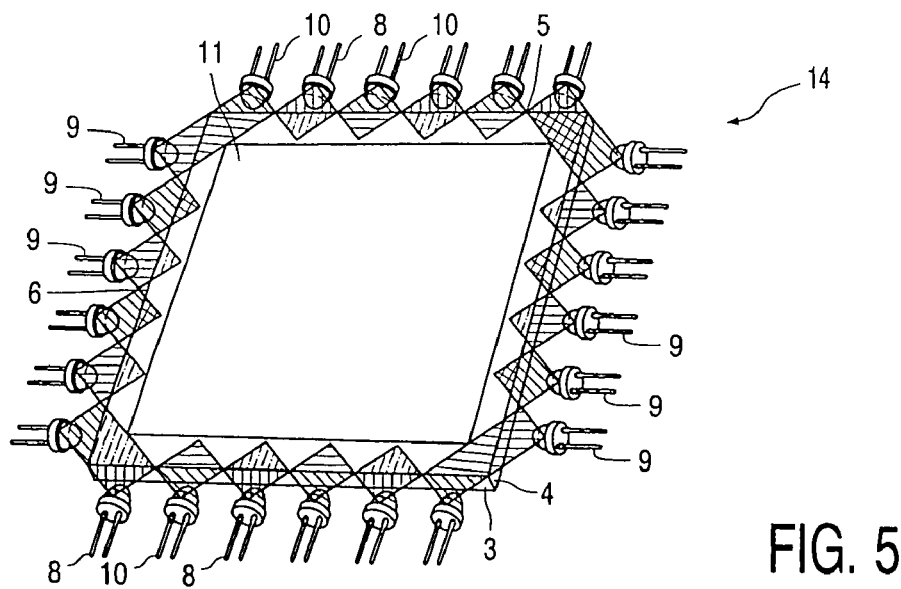

In contrast, FIGS. 3, 4 and 5 show possible embodiments of light panels according to the present invention, which are not intended to limit the scope of the invention, as it is defined in the accompanying claims.

FIG. 3 shows a light panel 12, having sub-arrays of light sources along two sides 3 and 4. The sub-array along side 3 comprises red LED's 8 and green LED's 9 in a sub-array, having a pattern RGRG, whereas along side 4 a sub-array of blue LED's 10 and green LED's 9 is arranged in a pattern BGBG. This complementary configuration of sub-arrays along at least two sides is therefore equivalent with the prior art configuration with a pattern RGBG along the same side with respect to the amount of light generated into the light panel 12, at least for rectangular panels with identical pitch between the LED's in the two sub-arrays, or more general for panels where the same ratio of differently colored LED's is employed. It will be evident to a person skilled in the art, that the distance required for effective mixing of light from the distinct LED's has been reduced and that the viewing window has been enlarged therewith, while the pitch is reduced between light sources of a single type or color.

As an alternative for the configuration shown in FIG. 3 it can even be contemplated to provide sub-arrays having patterns RBRB and GGGG respectively to also provide an equivalent with respect to light amounts and mix capabilities as a pattern RGBG along sides with again the advantage of a significantly reduced mixing length, which in this case for the green light emitting sub-array has been reduced to a minimum.

FIG. 4 shows a light panel 13 where along sides 3, 4 and 5 sub-arrays of light sources are arranged, with edge 4 comprising only a single color and the sides 3 and 5 comprising essentially identical sub-arrays of two types of LED's. Along sides 3 and 5 red LED's 8 and blue LED's 10 are arranged and along side 4 green LED's 9. Assuming that the numbers of LED's along each of the sides are equal, the equivalent of an array in a pattern RGB along these three sides is provided, but wherein the available space for the viewing window 11 has been increased considerably, together with a decrease in the pitch between light sources of one type/color. In the embodiment shown in FIG. 4 the two types of LED's 8, 10 and the flux ratios of these two types of LED's 8, 10 used at two sides 3, 5 opposite to each other should preferably be equal. In an alternative configuration a single type of LED is used at two opposite sides with, in case of employing in total three types of LED's, a combination of the two other types of LED's at a third side, or, in case of employing in total two types of LED's, the second type of LED at a third side.

In a further embodiment, such as it is shown in FIG. 5 a light panel 14 is provided with sub-arrays of light sources along each of the four sides 3, 4, 5 and 6. Sides 3, 5 and 4, 6 facing each other preferably comprise the same type/color of light sources and the same flux ratios between these sources. In the embodiment shown in FIG. 5 an alternating sequence of red LED's 8 and blue LED's 10 is associated with sides 3 and 5, while only green LED's 9 are associated with sides 4 and 6. Therefore in case of employing the same number of LED's along the sides, or in case of employing the same ratio between the different light sources, an equivalent of an array along all sides 3,4,5 and 6 having a pattern RGBG is provided in the light panel 14 of FIG. 5.

Figure 6:
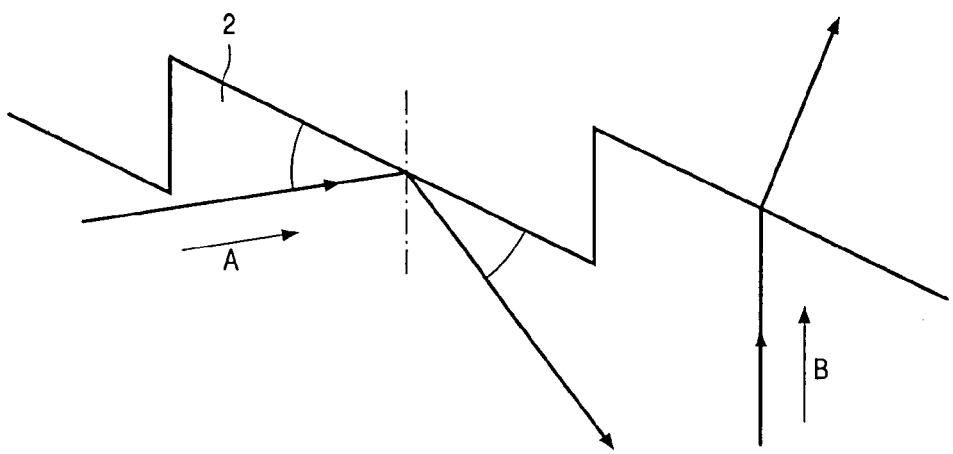
FIGS. 6 and 7 show means for selectively passing light from a predetermined origin out of the light panel.
Figure 7:
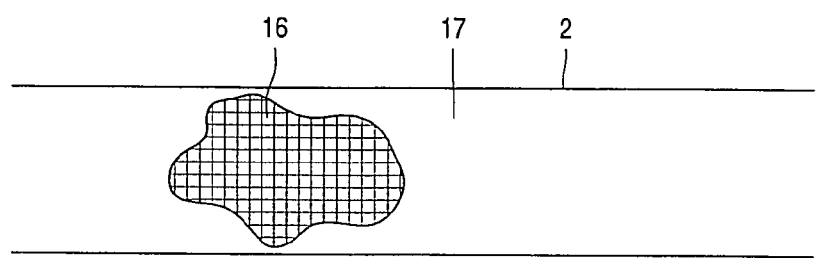

FIG. 6 shows one possible embodiment of means for out coupling light from the light guiding member, whereas in FIG. 7 another possibility is provided. The means for out coupling specific light exhibit a specific directional sensitivity, which is intended to prevent light propagating in a certain plane oriented perpendicular to the surface 7 from being reflected again and again in the light guide 2 based on total internal reflection, while not significantly coupling out light that is propagating in a direction more or less perpendicular to it. The outcoupling means are sensitive to the direction of the light propagating in the light guide 2. At least two different orientations of these out coupling means are to be used. As a result a specific light distribution coupled out of the light guide 2 is obtained with at every location on the surface 7 essentially identical contributions from the different sub-arrays. This is realized by employing one orientation of out coupling means to mainly couple out the light originating from one or two each other facing sides and another orientation of out coupling means to mainly couple out the light originating from one or two each other facing sides oriented essentially perpendicular to the other side(s). As a consequence, the two orientations of the outcoupling means are preferably perpendicular to each other. Other angles may be employed as well, but then a larger degree of cross talk is anticipated. The means for out coupling the light are applied in or on the front surface 7 or the back surface (not shown in the figures) of the light guide 2. Rectangular grooves can be used to couple out the light from sub-arrays at sides oriented parallel to these grooves. As an embodiment shown in FIG. 6, individual wedges or wedge shaped grooves can be employed. These means may or may not be provided with a reflective layer. It is noted here, that a gradient in the dimensions and/or the pitch of the wedges can be used to obtain a homogeneous distribution of light in a direction perpendicular to a specific sub-array of light sources.

FIG. 7 shows an alternative embodiment to achieve the same goal. Here a grating 16 is provided in a side 17 of the light guide 2, with which the same directional sensitivity can be achieved. Such a grating 16 may redirect the light differently from specular reflection (zero order mode) only in directions perpendicular to the grating lines. Therefore, a gradient in the dimensions of the grating 16 and/or the modulation depth of the grating 16 can be used to obtain a homogeneous distribution of passed light in the direction perpendicular to a specific sub-array of light sources. In the configuration of FIG. 3 two orthogonally oriented grating can be used, whereby passing of the light is controlled for the distinct sub-arrays of light sources independently. This can result in a wave guide with a pattern of small grating areas at one of the sides or surfaces thereof with a grating direction for at least some of these areas along one of the sides, which is used for in coupling, and for the other areas along the second side, which are then used also for in coupling.

Further, it may be advantageous to arrange the light sources at a predetermined distance from a corresponding side. In such a configuration color mixing is at least partly achieved, before the light is coupled into the wave guide. Thereby the combination of a sufficient degree of collimation of the light inside the light guide and a wide beam in the mixing cavity are ensured, whereby efficient color mixing is achieved. Further, specifically in a configuration shown in FIG. 3, a light panel according to the present invention has the advantage, that the "free" sides, (where no sub-array is arranged) can be used for electrical connection, for instance between an LCD, in which the light panel is used, and a drive circuitry and still have available a sufficient number of light sources to obtain brightness levels, that are comparable with or even higher than the brightness levels of conventional backlight panels.

After having been confronted with the present invention, as it has been exemplified in the above description of preferred embodiments, shown in the figures, the person skilled in the art will immediately realize a multitude of additional and alternative embodiments of the invention, which are explicitly not excluded from the invention according to the definition thereof in the accompanying claims. For instance other types of light sources than LED's can be used. Other colors than red, green and blue can be used, for instance different types of white phosphor LED's can be used, which have been prepared with different phosphor mixes. The shape of the light guide may not even be rectangular, but an angle between adjacent sides should preferably not approach or even exceed the angle of divergence of the light beams from the light sources. Preferably the main directions of the light beams inside the light guiding member, emitted from two sub-arrays with different types of light sources are oriented perpendicular to each other in order to couple these light beams out without or without significant cross-talk. Other means than rectangular or wedge shaped grooves, individual wedges, gratings extended over the entire viewing window or spatially restricted areas comprising a one-dimensional or two-dimensional (crossed) grating can be used for selective out coupling of light beams; additionally or alternatively color filters may be applied, as well as reflective surfaces, etc.

What is claimed is:

1. A light panel (1, 12, 13, 14), comprising: a light guide (2) having a front surface (7) defining a viewing window (11), a back surface and sides (3, 4, 5, 6) between the front and back surfaces; and a patterned array of light sources (8, 9, 10) of at least two types, which types are distinguished by the color of light emitted by the light sources of said at least two types, said array being arranged along at least one of the sides, wherein each light source generates in use a divergent light beam of a color into the panel to, in combination, color the panel characterized in that the array comprises complementary sub-arrays (8,9,8,9 & 9,10,9,10; 8,10,8,10 & 8,10, 8,10 & 9,9,9,9; 8,10,8,10 & 8,10,8,10 & 9,9,9,9 & 9,9,9,9) of light sources along at least two of the sides.

2. The light panel according to claim 1, wherein the light sources are of the red (R), green (G) and blue (B) types.

3. The light panel according to claim 2, wherein the sub-array along one of the at least two sides comprises alternately red and green type light sources, and the sub array along another of the at least two sides comprises alternately blue and green type light sources.

4. The light panel according to claim 2, wherein the sub-array along a first and second of the at least two sides comprises red and blue type light sources and the sub-array along a third of the at least two sides comprises green type light sources.

5. The light panel according to claim 4, wherein the panel comprises at least four sides and the sub-array along a fourth of the at least two sides comprises further green type light sources.

6. The light panel according to claim 1, wherein the light sources comprise light emitting diodes (8,9,10).

7. The light panel according to claim 1, further comprising means (15,16) for out coupling the light that are direction selective to out couple only or mainly the light originating from one of the types of sub-arrays used to irradiate one or two of the sides (3,4,5,6) of the light guiding member (2) in combination with means for outcoupling the light that are direction selective to outcouple only or mainly the light originating from the second type of sub-arrays used to irradiate one or two of the other sides of the light guiding member.

8. The light panel according to claim 7, wherein the means for out coupling light from mainly or only a specific light source of specific light sources comprise a pattern of wedge shapes (15).

9. The light panel according to claim 7, wherein the means for out coupling light from mainly or only a specific light source or specific light sources comprise a pattern of crossed grooves (16).

10. The light panel according to claim 7, wherein the means for out coupling light from mainly or only a specific light source or specific light sources comprise a 1-dimensional or one of the components of a 2-dimensional crossed grating (16).

11. The light panel according to any one of the preceding claims, where adjacent sides along which the sub-arrays are arranged enclose an angle of substantially 90°.

* * * * *